(12) United States Patent
Wuthnow et al.

(10) Patent No.: US 8,139,739 B2
(45) Date of Patent: Mar. 20, 2012

(54) ENHANCED ALERTING SYSTEM

(75) Inventors: Mark Wuthnow, Austin, TX (US); Danh Lai, Fremont, CA (US); Matthew Stafford, Austin, TX (US); Richard Tam, Austin, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 1875 days.

(21) Appl. No.: 11/124,520

(22) Filed: May 6, 2005

(65) Prior Publication Data

US 2006/0251232 A1   Nov. 9, 2006

(51) Int. Cl.
*H04M 3/42* (2006.01)
(52) U.S. Cl. .................. 379/201.01; 379/88.13
(58) Field of Classification Search .......... 379/201.01–201.02, 207.12–207.15, 379/221.01, 221.08–221.14, 230, 88.13–88.21, 379/202.01, 158; 455/415
See application file for complete search history.

(56) References Cited

U.S. PATENT DOCUMENTS

| | | | |
|---|---|---|---|
| 5,511,111 A | 4/1996 | Serbetcioglu et al. | |
| 5,796,806 A | 8/1998 | Birckbichler | |
| 5,999,599 A * | 12/1999 | Shaffer et al. ............... | 379/93.23 |
| 6,052,438 A * | 4/2000 | Wu et al. ...................... | 379/67.1 |
| 6,298,132 B1 * | 10/2001 | Harada et al. ............. | 379/375.01 |
| 6,343,115 B1 | 1/2002 | Foladare et al. | |
| 6,351,639 B1 * | 2/2002 | Motohashi ..................... | 455/420 |
| 6,434,126 B1 * | 8/2002 | Park .............................. | 370/328 |
| 6,519,326 B1 * | 2/2003 | Milewski et al. ............. | 379/67.1 |
| 6,553,109 B1 * | 4/2003 | Hussain et al. .......... | 379/207.02 |
| 6,622,016 B1 | 9/2003 | Sladek et al. | |
| 6,665,388 B2 | 12/2003 | Bedingfield | |
| 6,697,470 B2 * | 2/2004 | McDonough ............ | 379/142.01 |
| 6,882,838 B1 * | 4/2005 | Lee et al. ....................... | 455/417 |
| 6,954,654 B2 * | 10/2005 | Ejzak ............................ | 455/560 |
| 2002/0147824 A1 * | 10/2002 | Hurtta et al. .................. | 709/230 |
| 2002/0172338 A1 * | 11/2002 | Lee et al. ................. | 379/142.01 |
| 2003/0007497 A1 * | 1/2003 | March et al. .................. | 370/410 |
| 2003/0156690 A1 * | 8/2003 | Crockett et al. ........... | 379/93.23 |
| 2004/0038672 A1 | 2/2004 | Nguyen et al. | |
| 2004/0081305 A1 * | 4/2004 | Gonzalez et al. ........ | 379/207.16 |
| 2004/0109558 A1 * | 6/2004 | Koch ........................ | 379/373.01 |
| 2004/0120494 A1 * | 6/2004 | Jiang et al. ............... | 379/210.01 |
| 2004/0161083 A1 * | 8/2004 | Crockett et al. ........... | 379/93.23 |
| 2004/0165703 A1 * | 8/2004 | Jones ........................ | 379/88.13 |

(Continued)

OTHER PUBLICATIONS

The International Engineering Consortium, "Fundamentals of Telecommunications," Web ProForum Tutorials, http://www.iec.org, 26 pages.

(Continued)

*Primary Examiner* — William Deane, Jr.
(74) *Attorney, Agent, or Firm* — Zagorin O'Brien Graham LLP (57) ABSTRACT

An enhanced alerting system delivers caller identification information to a user of a mobile communications device with the called device announcing in an audio format the name associated with a calling device. The enhanced alerting system may be implemented by an Internet Protocol (IP) based system, e.g., IP Multimedia Subsystem (IMS). In at least one embodiment of the invention, an application server streams the announcement to the called communications device. In at least one embodiment of the invention, the service is network controlled. In at least one embodiment of the invention, the service is user equipment controlled. In at least one embodiment of the invention, a calling communications device streams the announcement to the called communications device in a request for a call session with the called communications device.

26 Claims, 6 Drawing Sheets

U.S. PATENT DOCUMENTS

| | | | |
|---|---|---|---|
| 2004/0190689 A1* | 9/2004 | Benitez Pelaez et al. | 379/88.13 |
| 2004/0213207 A1* | 10/2004 | Silver et al. | 370/352 |
| 2004/0260815 A1* | 12/2004 | Mampaey et al. | 709/227 |
| 2004/0267531 A1* | 12/2004 | Whynot et al. | 704/260 |
| 2005/0101303 A1* | 5/2005 | Pelaez et al. | 455/413 |
| 2006/0233339 A1* | 10/2006 | Schwartz | 379/207.02 |
| 2007/0269026 A1* | 11/2007 | Moss et al. | 379/70 |
| 2008/0086564 A1 | 4/2008 | Putman et al. | |

OTHER PUBLICATIONS

The International Engineering Consortium, "Intelligent Network (IN)," Web ProForum Tutorials, http://www.iec.org, 32 pages.

M. Handley, et al., "SIP: Session Initiation Protocol," Standards Track, Network Working Group, Mar. 1999, pp. 1-153.

3G Americas, "IP Multimedia Subsystem IMS Overview and Applications,"www.3gamericas.org/pdfs/ims_july2004.pdf, Jul. 2004, 17 pages.

Lucent Technologies, Bell Labs Innovations, "IP Multimedia Subsystem (IMS) Service Architecture," Jun. 2004, pp. 1-12.

Cisco Systems, "Chapter 1, SIP Messages and Methods Overview," pp. 1-1-1-2 ; and "Chapter 2, Successful Call Flow Scenarios," pp. 2-1-2-26, Session Initiation Protocol Gateway Call Flows, http://www.cisco.com, printed Feb. 18, 2005.

Ericsson, "IMS—IP Multimedia Subsystem," White Paper, Oct. 2004, 27 pages.

Verisign®, "Line Information Database Services," VeriSign Communications Services, 2004, 3 pages.

* cited by examiner

ENHANCED ALERTING SYSTEM

BACKGROUND OF THE INVENTION

1. Field of the Invention

The invention relates to telecommunications in general and more particularly to wireless communications devices.

2. Description of the Related Art

Caller identification information is typically presented to a user of a mobile communications device on a visual display. However, viewing the identity of a calling party on a display may be impossible or inconvenient for a user, e.g., due to a visual impairment or being engaged in another activity, such as operating a motor vehicle, that prevents the user from viewing a display safely. A user may configure the mobile communications device to play a distinctive ring tone to indicate an incoming call from a particular caller or group of callers. This approach requires the user to manually configure the mobile communications device and the user must remember ring tone assignments to callers. Similarly, a software application on the mobile communications device may recite the phone number of the calling party. For this approach to be effective, the user must have knowledge of the number or numbers from which a party may call. Accordingly, improved techniques for announcing caller identification information are desired.

SUMMARY OF THE INVENTION

An enhanced alerting system delivers caller identification information to a user of a mobile communications device with the called device announcing in an audio format the name associated with a calling device. The enhanced alerting system may be implemented by an Internet Protocol (IP) based system, e.g., IP Multimedia Subsystem (IMS). In at least one embodiment of the invention, an application server streams the announcement to the called communications device. In at least one embodiment of the invention, the service is network controlled. In at least one embodiment of the invention, the service is user equipment controlled. In at least one embodiment of the invention, a calling communications device streams the announcement to the called communications device in a request for a call session with the called communications device.

In at least one embodiment of the present invention, a method includes responding to a request from a first communications device to participate in a first call session between the first communications device and a second communications device by establishing a second call session between an application server and the second communications device. The method sends to the second communications device, during the second call session, an announcement associated with the first communications device.

In at least one embodiment of the present invention, a method includes sending from a first communications device to a second communications device an announcement associated with the first communications device. The announcement is sent in a request from the first communications device to participate in a call session between the first communications device and the second communications device. The announcement is in at least one of an audio format and an image format.

In at least one embodiment of the present invention, a communications system includes an alerting facility operable to establish, in response to a request from a first communications device to participate in a first call session between the first communications device and a second communications device, a second call session between an application server and the second communications device. The alerting facility is operable to send to the second communications device, during the second call session, an announcement associated with the first communications device.

In at least one embodiment of the present invention, a communications system includes a first alerting facility operable to send from a first communications device to a second communications device an announcement associated with the first communications device. The announcement is sent in a request to participate in a call session between the first communications device and the second communications device. The announcement is in at least one of an audio format and an image format.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE INVENTION

Figure 1:
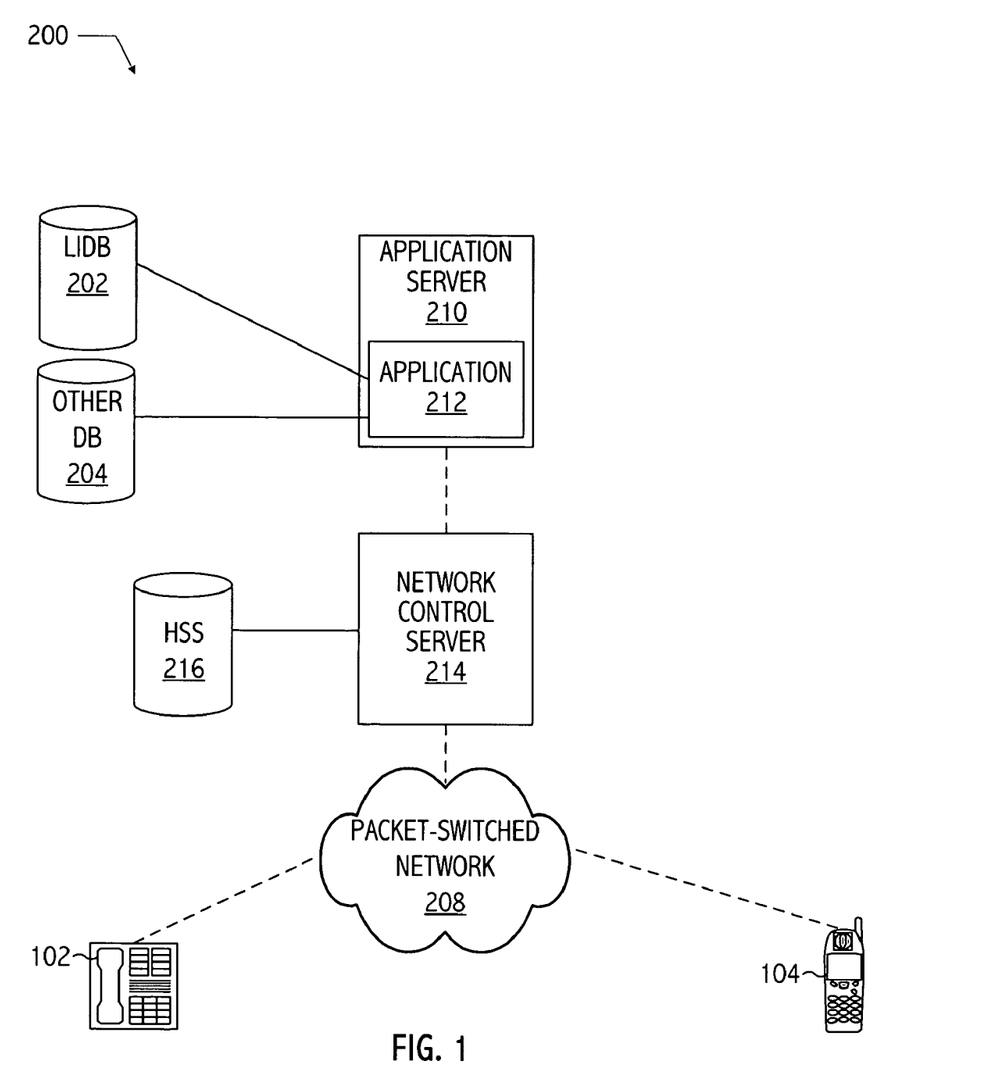
FIG. 1 illustrates an exemplary telecommunications system consistent with at least one embodiment of the present invention.

Referring to FIG. 1, exemplary telecommunications system 200 includes an Internet Protocol (IP) based network, e.g., network 208. Network 208 may include a network (e.g., routers and switches) compliant with IP Multimedia Subsystem (IMS) protocol, a subsystem of Universal Mobile Telecommunications System (UMTS), a system standardized by the Third Generation Partnership Project (3GPP). In general, networks compliant with IMS support real-time multimedia services (including voice) as well as enhanced interactivity and support for multiple services per session, e.g., sending audio and video information. Network 208 may include Session Initiation Protocol (SIP) networks or other IP-based networks, and/or a portion of network 208 may include non-IP-based networks, e.g., an Advanced Intelligence Network (AIN).

Network control server 214 is an exemplary control layer server that manages call or session set-up, modification, and release. Network control server 214 may provide registration of endpoints and routing of SIP signaling messages to appropriate application servers, e.g., network control server 214 may be a Call Session Control Function (CSCF), a provider-independent and standardized access point. Network control server 214 may include, or provide access to a Home Subscriber Service (HSS) database (e.g., HSS 216) that maintains a unique service profile for individual end users. A typical end user service profile stores user service information and preferences, e.g., current registration information, roaming information, telephony services, instant messaging service information, and voice mail box options. The service profile is generally shared by multiple applications and may simplify administration of user data across services.

Application server 210 is an exemplary application layer server that provides at least one end user service. Application server 210 may be a Telephony Application Server (TAS), i.e., a server that provides service logic for call processing services, e.g., digit analysis, routing, call setup, call waiting, call forwarding, or other services. A typical TAS may also invoke servers to provide appropriate call progress tones and announcements. Application server 210 may be separate from a TAS, e.g., a standalone server that provides a supplementary telephony service via a trigger. For example, when a call progresses to a trigger point, the TAS suspends call processing and checks a corresponding subscriber profile to determine if additional services should be applied to the call at that time. The subscriber profile identifies which application servers, if any, should be invoked. The CSCF formats a SIP IP Multimedia Service Control (ISC) message and passes call control to the appropriate application server, e.g., application server 210.

Figure 2:
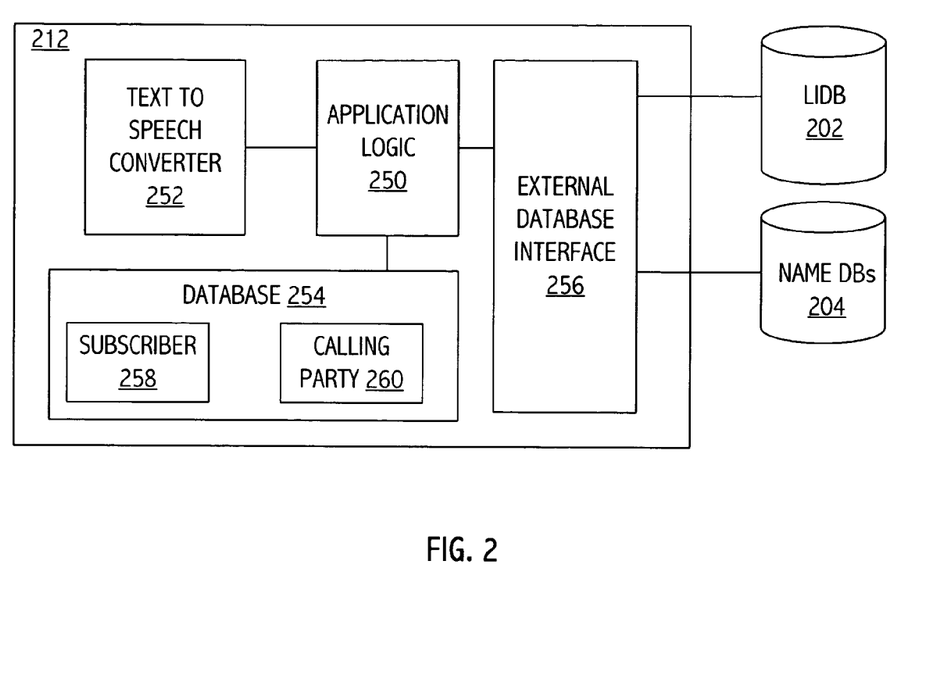
FIG. 2 illustrates an exemplary alerting facility consistent with at least one embodiment of the present invention.

In at least one embodiment of the invention, application server 210 includes application 212, which may be software and/or hardware that configures application server 210 to provide enhanced alerting functions. Referring to FIG. 1 and FIG. 2, an exemplary application 212 includes application logic 250 which may be invoked when a subscriber profile, i.e., the subscriber profile of a called party, indicates that enhanced alerting features are enabled (e.g., a user subscribes to this feature). Application logic 250 performs algorithms to implement the enhanced alerting system by controlling, e.g., interactions with text to speech converter 252, database 254, and external databases (e.g., LIDB 202 and other name databases 204) via external database interface 256. In at least one embodiment of the invention, database 254 includes information for treatment of particular subscribers and/or particular calling parties in subscriber information 258 and calling party information 260. Network control server 214 communicates call information including identifying information for the caller and the called party to application 212. Application 212 retrieves subscriber information for the called party from database 258 and information regarding calling parties from database 260.

Database 258 may include enhanced alerting service subscriber preferences including user groups and permissions, terminal type data, and/or other suitable information. For example, a subscriber may select a particular format for an announcement. The subscriber may select one announcement for particular callers and another announcement for other callers. The subscriber may prerecord an announcement for individual callers. The subscriber may select text to speech conversion for particular callers. For example, a previously entered name or a name retrieved from a database may be vocalized. Database 260 may include calling party preferences. Exemplary calling party information 260 includes identity of a database from which a prerecorded name associated with the calling party may be retrieved, user groups of visually-impaired users who have prerecorded their names to share with other visually impaired users, or other suitable information. For example, a calling party may prerecord a corresponding name to be announced upon calling a subscriber of the enhanced alerting system. In at least one embodiment of the invention, a prerecorded announcement includes an audio announcement, a digital image, and/or video announcement.

In at least one embodiment of the invention, if a calling party does not have a corresponding entry in database 254, application 212 may access external databases to associate a number with a corresponding name for a calling party. The external databases may include a line information database (e.g., LIDB 202) or other name database (e.g., database 204). Application 212 may convert the name information received from the external database into speech for an announcement to the called party. The external databases may be maintained by third-party vendors.

Figure 3:
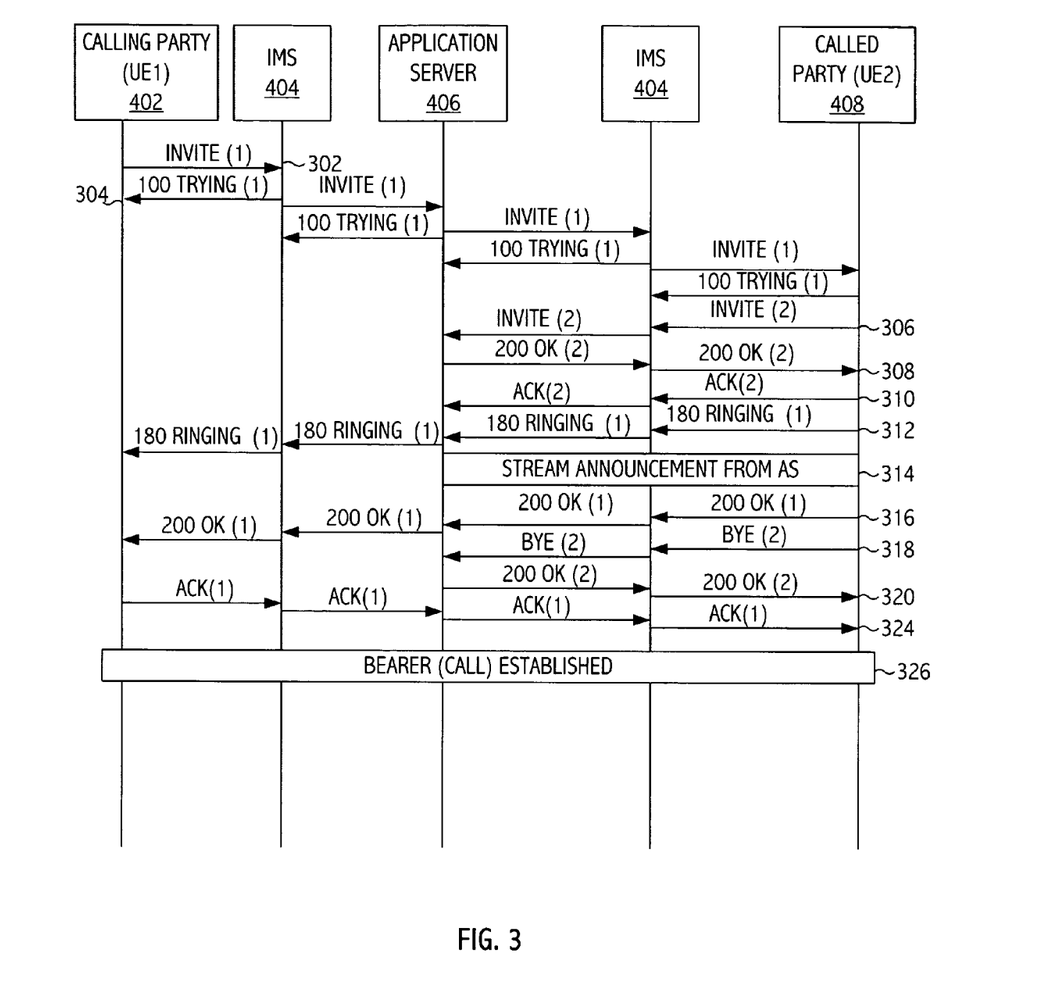
FIG. 3 illustrates information and control flows for a user equipment controlled signaling flow consistent with at least one embodiment of the present invention.

Referring to FIG. 3, an exemplary signaling flow illustrates a calling party, e.g., user equipment 1 (UE1), establishing a call session with a called party, e.g., user equipment 2 (UE2), which is configured for the enhanced alerting system. FIG. 3 illustrates UE1 and UE2 as being served by the same IMS network 404, without limitation and IMS network 404 appears twice in FIG. 3 for ease of illustration of signaling flows. However, UE1 and UE2 may be served different IMS networks and the signaling flow of FIG. 3 may be adapted accordingly. The user equipment (UE1 or UE2) may include a mobile communications device, e.g., cellular telephone, personal digital assistant (PDA), or other mobile communications device, or suitable fixed communications devices. The user equipment also includes a corresponding SIP gateway, which may be coupled to a mobile or fixed communications device via an IP network, Private Branch eXchange (PBX), T1/E1, Wireless Fidelity (WiFi) networks, or other suitable mechanism.

User equipment 1 sends an invitation to participate in a call session with UE2, e.g., INVITE(1), into IMS network 404, which may include network 208 and network control server 214 of FIG. 1 (302). IMS network 404 identifies UE2 as being a customer of a particular service provider and invokes a corresponding application server, e.g., application server 406. Application server 406 sends a corresponding invitation through IMS network 404 to UE2. IMS network 404 sends a response message to UE1, e.g., 100 TRYING(1), indicating that INVITE(1) was received and to stop any call timers (304). Similarly, as INVITE(1) is forwarded, each of the subsequent elements, appliction server 406, IMS 404, and UE2 sends a response message to its predecessor.

UE2 invites application sever 406 to engage in a call session with UE2 by sending INVITE(2) to application server 406 via IMS network 404 (306). Note that in at least one embodiment of the invention, 100 TRYING messages (not shown) are inserted in this portion of the signaling flow. Application server 406 indicates successful receipt, understanding of the invitation INVITE(2), and acceptance of the invitation by response message 200 OK(2) (308). UE2 sends an ACK request (e.g., ACK(2)) to application server 406, confirming the receipt of a final response to INVITE(2) (310). Knowing that the audio alerting tone is now confirmed, UE2 sends 180 RINGING (1) back to UE1 to initiate a ring back tone on UE1 (312). The ring back tone indicates that UE2 is alerting the user of UE2. A call session, i.e., a packet stream for delivering audio and/or video data, e.g., an RTP compliant packet stream, is established between application server 406 and UE2. Application server 406 streams (i.e., transfers data in a stream of packets that are interpreted as they arrive for just-in-time delivery of multimedia information) an announcement (e.g., a name in an audio format) to UE2 (314).

The user of UE2 may answer the call. Upon answering the call, UE2 sends an acceptance of INVITE(1) by response message 200 OK(1) (316). In conjunction with the acceptance, UE2 disconnects the call session with application server 406 (i.e., the call session for streaming the announcement) by sending a BYE request (e.g., BYE(2)) to application server 406 (318). Application server 406 acknowledges the tearing down of the call session between application server 406 and UE2 with 200 OK(2) (320). UE1 acknowledges the acceptance of the call session by UE2 by sending ACK(1) to UE2 (324). The call session is established and a conversation between UE1 and UE2 begins (326). Although in the signal flow of FIG. 3 the call from UE1 originates from an IMS network, in at least one embodiment of the invention, the call originates from another suitable network, e.g., an SS7 ISDN User Part (ISUP).

Figure 4:
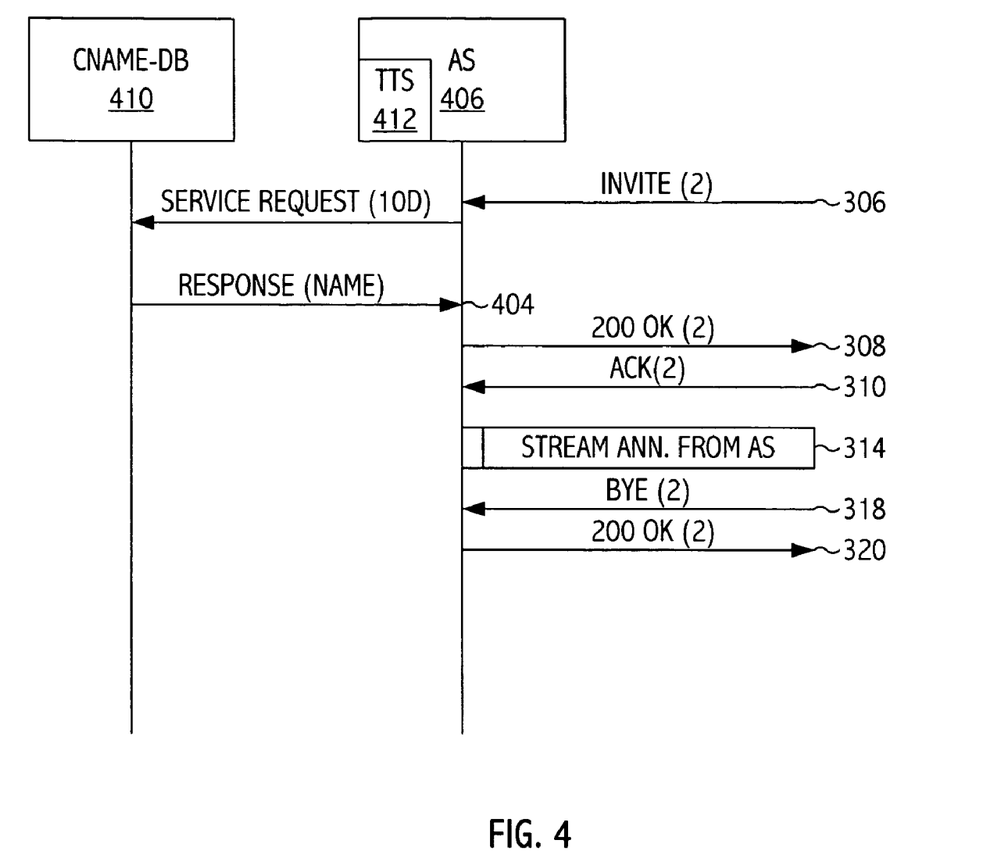
FIG. 4 illustrates information and control flows for a user equipment controlled signaling flow consistent with at least one embodiment of the present invention.

Referring to FIG. 4, in at least one embodiment of the present invention, upon receiving INVITE(2) from UE2 (306), application server 406 sends a service request (e.g., SERVICE REQUEST (10D)) to a caller name database (e.g., CNAME-DB 410). CNAME-DB 410 returns a name of the calling party corresponding to UE1 (404). The response may include text, an audio clip, an image, and/or a video clip. CNAME-DB 410 may be a LIDB compliant database with the TR-1188 protocol, a variation thereof, or a name database compliant with another suitable protocol. Message flows may vary according to interfaces between application server 406 and a name database. Text-to-speech converter 412 may be invoked to convert a text name into an audio format, e.g., a WAV (WAVEform audio format), MP3 (MPEG-1/2 Audio Layer 3), or other suitable format, using any suitable conversion technique. Text-to-speech converter 412 may stream the name to UE2 (314).

Figure 5:
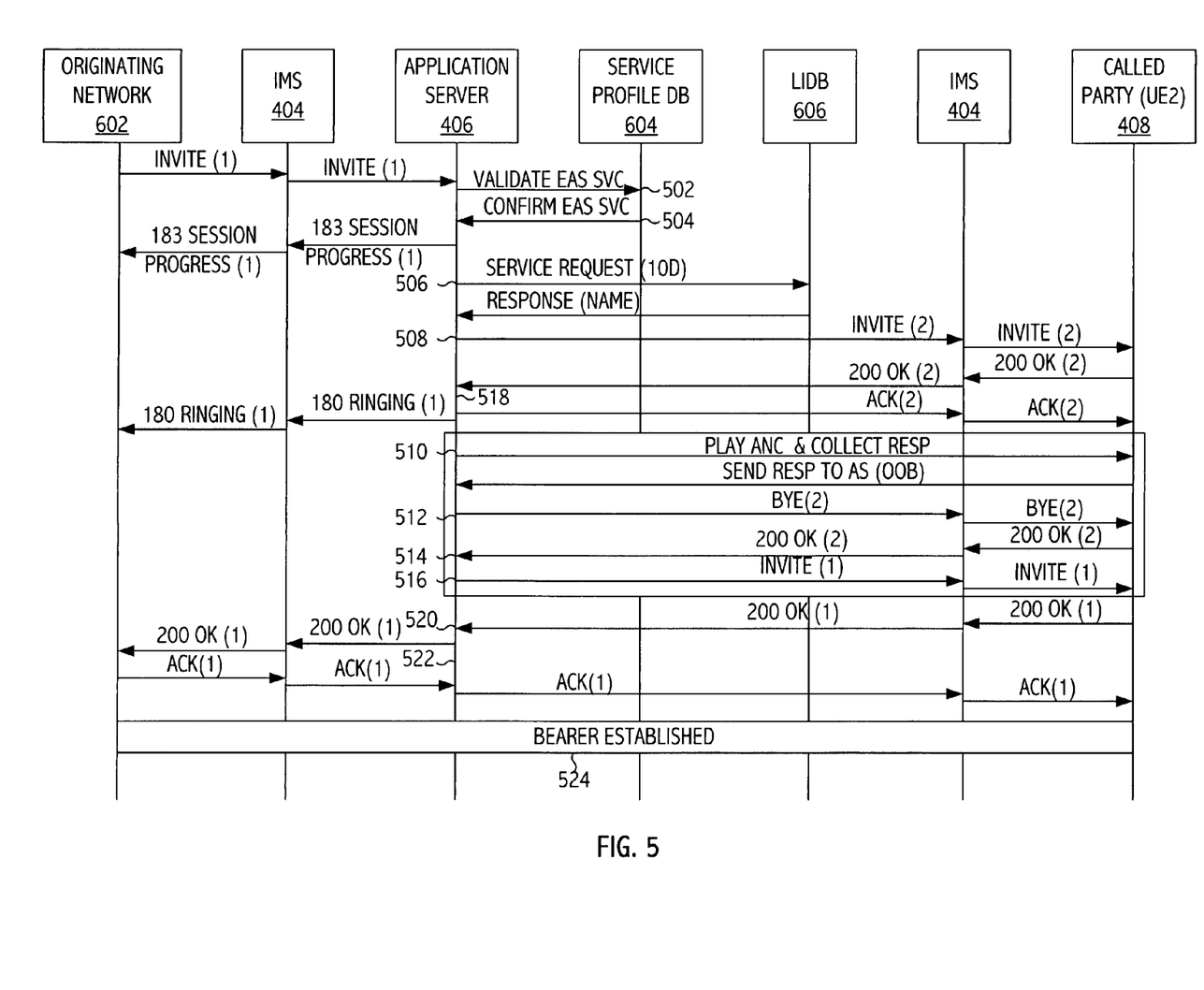
FIG. 5 illustrates information and control flows for an application server controlled signaling flow consistent with at least one embodiment of the present invention.

The aforementioned technique described with reference to FIG. 3 and FIG. 4 is a user equipment controlled signaling flow, i.e., the user equipment includes intelligence to initiate establishing and tearing down the call session between the user equipment and the application server and controls message responses to the call session between user equipment. FIG. 5 illustrates an application server controlled signaling flow, i.e., the application server includes intelligence to initiate establishing and tearing down of a call session between user equipment and the application server and to control message responses to the call session between user equipment.

FIG. 5 illustrates user equipment in an originating network and a called party as being served by the same IMS network 604, without limitation and IMS network 604 appears twice in FIG. 5 for ease of illustration of signaling flows. User equipment in originating network 602 sends an invitation to participate in a call session with called party UE2, e.g., INVITE(1), into IMS network 404, which may include network 208 and network control server 214 of FIG. 1. IMS network 404 identifies UE2 as being a customer of a particular service provider and invokes a corresponding application server, e.g., application server 406. Application server 406 determines whether UE2 is a subscriber to the enhanced alerting system by sending a validate message to service profile database 604 (502) (e.g., by application server 210 communicating with application 212 in FIG. 1) and receiving a confirmation message from service profile database 604 upon a successful validation (504). Within IMS network 404, subscriber profile provisioning identifies whether the customer associated with UE2 is subscribed to the enhanced alerting system and routes the call to application server 406 accordingly. Application server 406 retrieves user preferences from service profile database 604. Application server 406 sends a response message to originating network 602, e.g., 183 SESSION PROGRESS (1), indicating that INVITE (1) was received. Since UE2 is a subscriber to the enhanced alerting system, application server 406 sends a service request to a name database (e.g., LIDB 606) to retrieve a name corresponding to the caller from originating network 602 (506).

Upon receiving the name in a response from the name database, application server 406 converts the name into an audio format and sends an invitation (e.g., INVITE(2)) to UE2 to participate in a call session with application server 406 (508). Application server 406 sends 180 RINGING (1) back to originating network 602 to initiate a ring back tone to UE1 in originating network 602 (518). When the call session is established, application server 406 streams the announcement to UE2 and waits to collect a response from UE2 (510). Application server 406 tears down the call session after receiving a response (e.g., 200 OK(2)) from UE2 (514). Application server 406 sends an invitation corresponding to the original INVITE(1) from originating network 602 to UE2 (516). Application server 406 receives response from UE2 (520) and forwards the same to the calling party in the originating network. Originating network 602 acknowledges the acceptance of the call session by UE2 by sending ACK(1) to called party 408 (522) and an end-to-end call session is established between user equipment (524). In at least one embodiment of the invention, the call originates from an IMS network or other suitable network, e.g., an SS7 ISDN User Part (ISUP).

Figure 6:
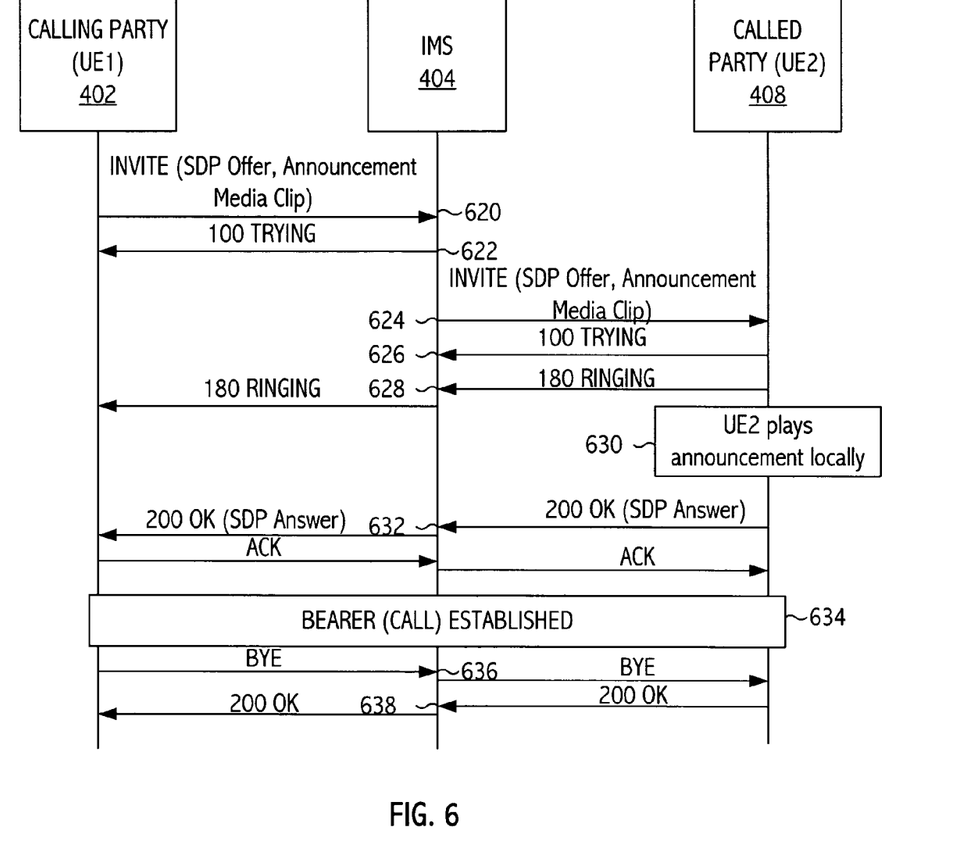
FIG. 6 illustrates information and control flows for a user equipment controlled signaling flow without an application server and without a network name database consistent with at least one embodiment of the present invention.

In at least one embodiment of the invention, an originating communications device communicates an audio clip through a network to a terminating communications device. Referring to FIG. 6, user equipment associated with a calling party (e.g., UE1) sends an invitation to participate in a call session with UE2 (e.g., INVITE) into IMS network 404, which may include network 208 and network control server 214 of FIG. 2 (620). UE1 and UE2 support Multipurpose Internet Mail Extensions (MIME) or other standard consistent with IMS network 404. An exemplary INVITE request is partitioned into discrete Session Description Protocol (SDP) segments including an Offer segment and an Announcement Media Clip segment. In at least one embodiment of the invention, the message flow is transported using a Transmission Control Protocol (TCP). The announcement media clip may include a voice clip, an image clip, or other suitable information encoded according to a registered MIME type (e.g., IETF RFC 3267 corresponding to an AMR codec, suitable for voice clips, IETF RFC 2046 corresponding to a JPEG MIME type, suitable for an image clip, or other types supported by UE1 and UE2).

MS Network 404 sends a response message to UE1 (e.g., 100 TRYING) to inform UE1 that session initiation is in progress (622). IMS network 404 sends an invitation including the announcement to UE2 (624). UE2 sends a response message to IMS network 404 (e.g., 100 TRYING) to inform IMS network 404 that session initiation is in progress (626). UE2 sends 180 RINGING back to UE1 via IMS network 404 to initiate a ring back tone on UE1 (628). The ring back tone indicates that UE2 is alerting the user of UE2 (630). UE2 plays the announcement media clip locally (630). Upon a user answering the call, UE2 sends a response message 200 OK to UE1 indicating acceptance of the call session (632) and an end-to-end call session is established between UE1 and UE2 (634). UE1 disconnects the call session with UE2 by sending a BYE request to UE2 (636). UE1 tears down the call session after receiving a response (e.g., 200 OK) from UE2 (638).

Other signaling implementations, (e.g., networks that seize dedicated transmission channels to interconnect switches of a network) include techniques to address audio clipping, a phenomena that may occur when a full-duplex channel is not established in sufficient time to communicate the beginning portion of a communication from a called party to the calling party (e.g., a greeting or other word(s) used by the called party in answering a call). In at least one embodiment of the present invention, audio clipping is addressed by establishing a duplex communication path from the called party to the calling party prior to voice or data communication from the called party to the calling party.

In addition, other signaling implementations (e.g., signaling implementations that seize a dedicated transmission channel as described above) may begin billing the call prior to establishing the call between the calling party and the called party (e.g., upon seizing a channel although the call may not be established until a time substantially after seizing the channel because an announcement is being communicated to the called party). Such implementations may later adjust billing by applying a zero-rate to a portion of the communication prior to establishing the call. In at least one embodiment, the present invention does not establish a connection between the calling party and called party to communicate the announcement to the called party. Thus, in at least one embodiment, the present invention simplifies billing techniques by allowing billing to begin upon establishing the call session between the calling party and the called party (e.g., after 316 or 324 of FIG. 3, after 520 or 522 of FIG. 5, or after 632 or 633 of FIG. 6).

The description of the invention set forth herein is illustrative, and is not intended to limit the scope of the invention as set forth in the following claims. Variations and modifications of the embodiments disclosed herein, may be made based on the description set forth herein, without departing from the scope and spirit of the invention as set forth in the following claims.

The invention claimed is:

1. A method comprising:
   obtaining, by an application server of a network, confirmation from a service profile database that a called communications device is subscribed to an alerting service, the obtaining being in response to a request from a calling communications device to participate in a first call session between the calling communications device and the called communications device;
   obtaining, by the application server in response to the confirmation, identity information corresponding to the calling communications device from a name database;
   generating, by the application server, an announcement based on the identity information corresponding to the calling communications device and a service profile associated with the called device obtained from the service profile database;
   establishing, by the application server, a second call session between the application server and the called communications device;
   sending the announcement to the called communications device, from the application server, during the second call session; and
   sending, by the application server, an invitation for the called communications device to participate in the first call session in response to a reply to the announcement, the reply being received by the application server from the called communications device.

2. The method, as recited in claim 1, wherein the announcement comprises a name associated with the calling communications device in an audio format.

3. The method, as recited in claim 2, further comprising:
   associating the name in the audio format with the calling communications device.

4. The method, as recited in claim 2, wherein the name in the audio format comprises a prerecorded spoken rendition.

5. The method, as recited in claim 2, wherein the generating comprises:
   converting the name from text to the audio format.

6. The method, as recited in claim 1, further comprising:
   releasing the second call session, by the application server, in response to the reply to the announcement; and
   receiving, subsequent to releasing the second call session, a response from the called communications device corresponding to the request to participate in the first call session.

7. The method, as recited in claim 1, wherein the application server is an element of a network, the network coupling the calling and called communications devices.

8. The method, as recited in claim 7, wherein the establishing comprises:
   requesting the second call session by the application server.

9. The method, as recited in claim 1, further comprising:
   establishing the first call session subsequent to releasing the second call session.

10. The method, as recited in claim 9, wherein establishing the first call session comprises establishing a duplex communications path between the calling communications device and the called communications device prior to voice or data communications from the called communications device to the calling communications device.

11. The method, as recited in claim 9, further comprising:
    billing the first call session in response to the establishment of the first call session.

12. The method, as recited in claim 1, wherein the announcement associated with the calling communications device comprises information associated with the calling communications device in at least one of an image format and a video format.

13. The method, as recited in claim 1, further comprising:
    setting the service profile by a user of the called communications device.

14. The method, as recited in claim 1, wherein the announcement is generated based on user preferences in the service profile associated with the called communications device.

15. The method, as recited in claim 1, further comprising:
    forwarding, by the application server the reply from the called communications device to the calling communications device.

16. The method, as recited in claim 1, further comprising:
    forwarding to the called communications device, by the application server, an acknowledgement of the calling communications device of acceptance of the second call session by the called communications device.

17. A communications system comprising:
    a service profile database of an alerting service, the service profile database being configured to store a service profile corresponding to a called communications device; and
    an alerting facility operable to establish, in response to a request from a calling communications device to participate in a first call session between the calling communications device and a called communications device, a second call session between the alerting facility and the called communications device, the alerting facility being further operable to send to the called communications device, during the second call session, an announcement, the alerting facility being further operable to send an invitation for the called communications device to participate in the first call session in response to the alerting facility receiving a reply to the announcement, the reply being received by the alerting facility from the called communications device, the alerting facility being further operable to generate the announcement based on identity information corresponding to the calling communications device obtained from a name database and the service profile corresponding to the called communications device obtained from the service profile database, in response to confirmation from the service profile database that the called communications device is subscribed to the alerting service.

18. The communications system, as recited in claim 17, wherein the announcement comprises a name associated with the calling communications device in an audio format.

19. The communications system, as recited in claim 17, further comprising:

a provider-independent and standardized server coupled to the alerting facility.

20. The communications system, as recited in claim 17, wherein the second call session is established and released prior to a response from the called communications device corresponding to the request.

21. The communications system, as recited in claim 17, wherein the service profile database stores prerecorded names in an audio format, at least one of the names being stored in the service profile database corresponding to the calling communications device.

22. The communications system, as recited in claim 17, wherein the name is provided to the alerting facility in a text format and the name is converted into an audio format.

23. The communications system, as recited in claim 17, wherein the alerting facility retrieves the name from the name database, the name database being external to the network.

24. The communications system, as recited in claim 17, wherein the alerting facility comprises a computer program product executable, wherein the computer program product executable is encoded in one or more computer readable media selected from the set of disk, tape, or other magnetic, optical, or electronic storage medium.

25. An apparatus comprising:

a service profile storage means configured to store service profile information for an alerting service; and means for establishing, in response to a request from a calling communications device to participate in a first call session between the calling communications device and a called communications device, a second call session between an application server and the called communications device, the means for establishing being configured to obtain from the service profile storage means confirmation that the called communications device is subscribed to the alerting service, the means for establishing being further configured to send to the called communications device, during the second call session, an announcement generated based on identity information corresponding to the calling communications device obtained from a name database and a service profile associated with the called device obtained from the service profile storage means, and the means for establishing being further configured to send an invitation for the called communications device to participate in the first call session in response to receiving a reply to the announcement from the called communications device.

26. The apparatus, as recited in claim 25, wherein the means for establishing generates the announcement comprising a name in an audio format.

* * * * *